United States Patent
Kitai et al.

(10) Patent No.: US 8,792,128 B2
(45) Date of Patent: Jul. 29, 2014

(54) APPARATUS, SYSTEM, AND METHOD OF INSPECTING IMAGE, AND RECORDING MEDIUM STORING IMAGE INSPECTION CONTROL PROGRAM

(75) Inventors: Tadashi Kitai, Kanagawa (JP); Hitomi Kaneko, Saitama (JP); Hiroyoshi Ishizaki, Kanagawa (JP); Keiji Kojima, Kanagawa (JP); Keiichi Miyamoto, Kanagawa (JP); Hiroyuki Kawamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 156 days.

(21) Appl. No.: 13/572,989

(22) Filed: Aug. 13, 2012

(65) Prior Publication Data

US 2013/0044347 A1  Feb. 21, 2013

(30) Foreign Application Priority Data

Aug. 16, 2011 (JP) ................. 2011-178080
Jul. 23, 2012 (JP) ................. 2012-162680

(51) Int. Cl.
*G06K 15/00* (2006.01)

(52) U.S. Cl.
USPC .......... 358/1.18; 358/1.14; 358/504; 347/19; 382/294; 382/295; 382/291; 382/293; 382/209

(58) Field of Classification Search
CPC .......................... B41F 33/0036; G06T 7/0024
USPC ........ 358/1.18, 1.14, 504; 382/151, 294, 295, 382/287, 291, 293, 112, 141; 347/19
See application file for complete search history.

(56) References Cited

U.S. PATENT DOCUMENTS

| | | | |
|---|---|---|---|
| 6,366,358 B1 * | 4/2002 | Satou et al. | 358/1.14 |
| 6,912,304 B1 * | 6/2005 | Aghajan | 382/149 |
| 7,418,155 B2 * | 8/2008 | Nose et al. | 382/275 |
| 8,585,174 B2 * | 11/2013 | Saita | 347/19 |
| 2004/0215411 A1 * | 10/2004 | Howe | 702/85 |
| 2007/0140563 A1 * | 6/2007 | Kano et al. | 382/190 |
| 2007/0153077 A1 * | 7/2007 | Yamauchi et al. | 347/116 |
| 2008/0019727 A1 * | 1/2008 | Honma | 399/82 |
| 2010/0110597 A1 * | 5/2010 | Sun | 361/87 |
| 2010/0188714 A1 | 7/2010 | Yamakawa | |
| 2011/0134458 A1 * | 6/2011 | Kojima et al. | 358/1.14 |
| 2011/0316925 A1 * | 12/2011 | Saita | 347/19 |
| 2012/0121139 A1 * | 5/2012 | Kojima et al. | 382/112 |

FOREIGN PATENT DOCUMENTS

| | | |
|---|---|---|
| JP | 3-195955 | 8/1991 |
| JP | 5-014682 | 1/1993 |
| JP | 5-162294 | 6/1993 |
| JP | 2002-063566 | 2/2002 |
| JP | 2003-094594 | 4/2003 |
| JP | 2004-195878 | 7/2004 |
| JP | 2005-223515 | 8/2005 |
| JP | 2010-151606 | 7/2010 |
| JP | 2010-165011 | 7/2010 |

* cited by examiner

*Primary Examiner* — Dennis Dicker
(74) *Attorney, Agent, or Firm* — Harness, Dickey & Pierce, P.L.C.

(57) ABSTRACT

An inspection apparatus, inspection system, inspection method, and inspection control program stored in a recording medium, each of which sets a reference point in a master image and a read image read from a printed image, which is to be used for detecting the positional shift between the read image and the master image, based on determination whether a pattern previously added to the printed image for detecting the positional shift is available or can be used to effectively detect the positional shift.

12 Claims, 9 Drawing Sheets

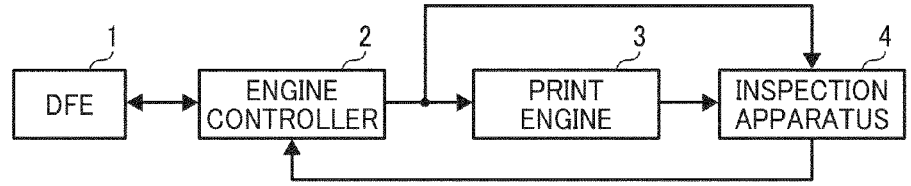
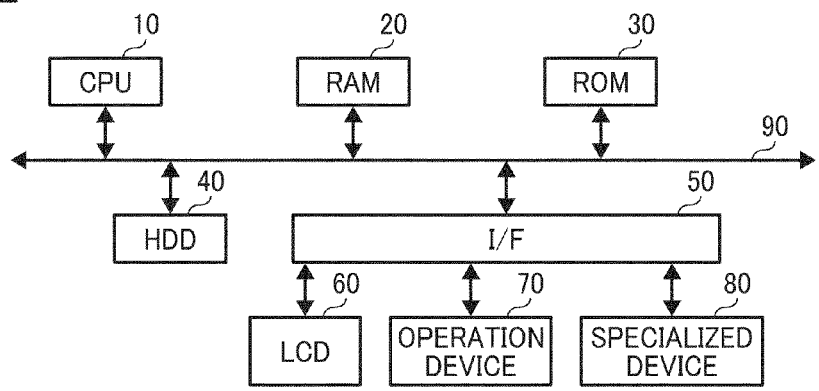
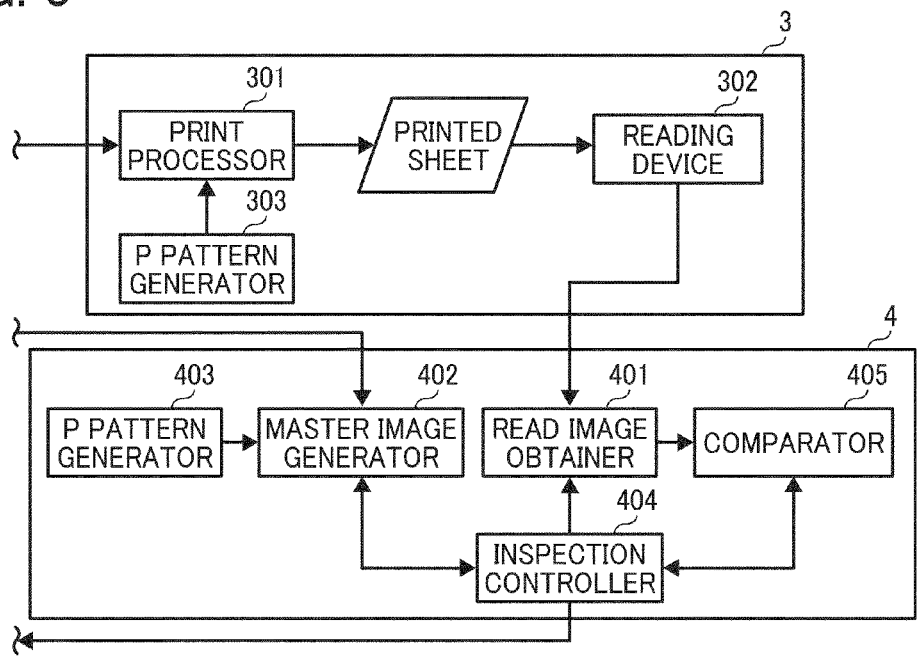

● DOT ADDED
○ DOT NOT ADDED
● DOT ADDED BASED ON DATA

FIG. 11A

| -1 | -1 | -1 | -1 | -1 |
|----|----|----|----|----|
| -1 | -1 | -1 | -1 | -1 |
| -1 | -1 | 1  | 1  | 1  |
| -1 | -1 | 1  | 1  | 1  |
| -1 | -1 | 1  | 1  | 1  |

FIG. 11B

| -1 | -1 | -1 | -1 | -1 |
|----|----|----|----|----|
| -1 | -1 | -1 | -1 | -1 |
| 1  | 1  | 1  | -1 | -1 |
| 1  | 1  | 1  | -1 | -1 |
| 1  | 1  | 1  | -1 | -1 |

FIG. 11C

| -1 | -1 | 1  | 1  | 1  |
|----|----|----|----|----|
| -1 | -1 | 1  | 1  | 1  |
| -1 | -1 | 1  | 1  | 1  |
| -1 | -1 | -1 | -1 | -1 |
| -1 | -1 | -1 | -1 | -1 |

FIG. 11D

| 1  | 1  | 1  | -1 | -1 |
|----|----|----|----|----|
| 1  | 1  | 1  | -1 | -1 |
| 1  | 1  | 1  | -1 | -1 |
| -1 | -1 | -1 | -1 | -1 |
| -1 | -1 | -1 | -1 | -1 |

| COORDINATE NUMBER | COORDINATE | |
|---|---|---|
| #1 | ( xxx , xxx) | |
| #2 | ( xxx , xxx) | ... |
| #3 | ( xxx , xxx) | |
| ... | | |

| PLANE | AREA | COORDINATE | SELECT PATTERN | |
|---|---|---|---|---|
| R | A | ( xxx , xxx) | PATTERN NUMBER #1,1 | |
| R | B | ( xxx , xxx) | COORDINATE NUMBER #3 | ... |
| R | C | ( xxx , xxx) | PATTERN NUMBER #xxx,xxx | |
| R | D | ( xxx , xxx) | PATTERN NUMBER #xxx,xxx | |
| ... | | | | |

APPARATUS, SYSTEM, AND METHOD OF INSPECTING IMAGE, AND RECORDING MEDIUM STORING IMAGE INSPECTION CONTROL PROGRAM

CROSS-REFERENCE TO RELATED APPLICATIONS

This patent application is based on and claims priority pursuant to 35 U.S.C. §119 to Japanese Patent Application Nos. 2011-178080, filed on Aug. 16, 2011, and 2012-162680, filed on Jul. 23, 2012, in the Japan Patent Office, the entire disclosure of which is hereby incorporated herein by reference.

BACKGROUND

1. Field

The present invention relates to an apparatus, system, and method of inspecting an image formed by an image forming apparatus, and a recording medium storing an image inspection control program.

2. Background

The recent image forming system may be provided with an inspection apparatus, which reads a printed image output from an image forming apparatus, generates a master image from image data of the printed image, and compares the read image with the master image to determine whether the printer image sufficiently reproduces the image data. To compare between the read image and the master image, each pixel in the read image needs to be compared with a corresponding pixel in the master image. In view of this, the pixel position of the master image may be corrected so as to match the pixel position of the read image, which may shrink in size or may be skewed during print processing, by enlarging or reducing the size of the master image or rotating the master image. For example, the inspection apparatus may specify a plurality of reference points in the read image, which correspond to a plurality of reference points in the master image, by pattern matching. Based on the positional shifts of the reference points between the read image and the master image, a correction parameter to be used for correcting the master image may be set.

While the reference point is usually defined as a marker in case of offset printing, when cut paper is used for printing, the reference point needs to be defined to make comparison between the read image and the master image. Japanese Patent Application Publication No. 2004-195878 discloses a technique of adding a yellow dot pattern to an image to be formed on a recording sheet, and using the yellow dot pattern as the reference point to detect the positional shift in the printed image with the master image. This technique of using the yellow dot pattern is applicable when the printed image is a color image that is formed using a color image forming apparatus. When a monochrome image forming apparatus is used or when a monochrome image is to be printed, the yellow dot pattern is not added such that it would not be possible to inspect the printed image using the reference point.

Further, when the yellow dot pattern is added to an area of the printed image having yellowish color, it may be difficult for the inspection apparatus to extract the yellow dot pattern from the read image. In such case, Japanese Patent Application Publication No. 2004-195878 uses a projection histogram generated for each one of the vertical and horizontal directions of the image. However, when the printed image is skewed, such technique using the histogram cannot be used to correctly detect the positional shift in the printed image.

SUMMARY

In view of the above, one aspect of the present invention is to provide an apparatus, system, method, and an inspection control program stored in a recording medium, each of which is capable of setting a reference point, respectively, in a master image and a read image read from a printed image, which is to be used for detecting the positional shift between the read image and the master image, based on determination whether a pattern previously added to the printed image for detecting the positional shift is available or can be used to effectively detect the positional shift.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is a schematic block diagram illustrating an image forming system including an inspection apparatus, according to an example embodiment of the present invention;

FIG. 2 is a schematic block diagram illustrating a hardware structure of a control section of any one of an engine controller, a print engine, and the inspection apparatus of FIG. 1, according to an example embodiment of the present invention;

FIG. 3 is a schematic block diagram illustrating functional structures of the print engine and the inspection apparatus of FIG. 1, according to an example embodiment of the present invention;

FIGS. 11A to 11D are an illustration for explaining a corner extraction filter used for extracting the corners of the image;

Figure 4:
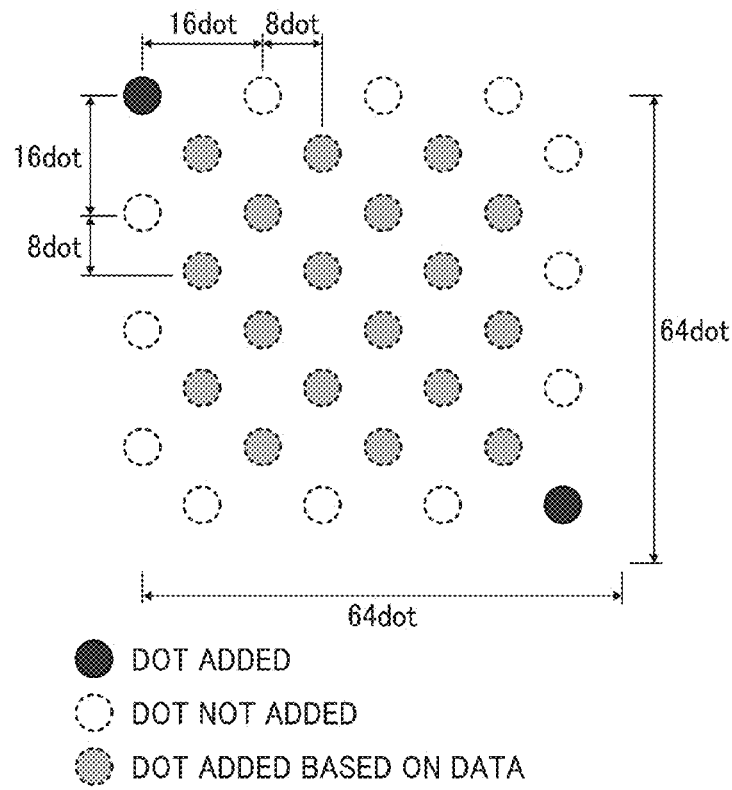
FIG. 4 is an illustration for explaining a P pattern to be added to an image, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following examples, an image forming system is provided, which includes a digital front end (DFE) that generates a binary image of image data to be printed using a dither matrix, a print engine that forms a printed image based on the binary image under control of an engine controller, and an inspection apparatus that inspects the printed image formed by the print engine 3 using a master image that is generated by converting the binary image into a multivalue image.

FIG. 1 illustrates a configuration of an image forming system according to an example embodiment of the present invention. The image forming system of FIG. 1 includes a digital front end (DFE) 1, an engine controller 2, a print engine 3, and an inspection apparatus 4. The image forming system of FIG. 1 may be used for production printing in which a large number of images are sequentially printed and output. The images to be printed may be the same or different, depending on the image data.

The DFE 1 receives a print job, which includes image data to be printed, from an information processing apparatus such as a personal computer through a network. The DFE 1 applies halftone processing to image data to be printed to generate a binary image, and outputs the binary image and dither matrix data that is used for halftone processing to the engine controller 2. The binary image may be formed as an image in which each image pixel is expressed in chromatic or achromatic color (such as black or white). Alternatively, the binary image may be formed as an image in which each image pixel is expressed in two of cyan, magenta, yellow, and black colors.

The engine controller 2 receives the binary image and the dither matrix data from the DFE 1, and controls the print engine 3 to form an image based on the binary image. The engine controller 2 further inputs the binary image to the inspection apparatus 4.

The print engine 3 forms an image on a recording sheet based on the binary image under control of the engine controller 2, and outputs the formed image as a printed image. The print engine 3 further reads the printed image using a reading device to generate read image data ("read image"), and inputs the read image to the inspection apparatus 4.

The inspection apparatus 4 converts the binary image input from the engine controller 2 into a multivalue image to generate a master image, which is used for inspecting the printed image of the print engine 3. The inspection apparatus 4 compares a reference point in the read image input from the print engine 3 with a reference point in the master image to correct pixel positions of the read image or the master image before inspecting the printed image of the print engine 3. More specifically, based on the difference in the reference point, the inspection apparatus 4 corrects the pixel positions of the read image or the mater image, such that the positional shift in the read image is corrected. The inspection apparatus 4 further inspects the read image that reflects the printed image, based on difference between the read image and the master image in pixel value.

Referring now to FIG. 2, a hardware structure of the inspection apparatus 4 is explained according to an example embodiment of the present invention.

As illustrated in FIG. 2, the inspection apparatus 4 is implemented by an information processing apparatus such as a personal computer or a server computer. The inspection apparatus 4 includes a central processing unit (CPU) 10, a random access memory (RAM) 20, a read only memory (ROM) 30, a hard disk drive (HDD) 40, and an interface (I/F) 50, which are connected through a bus 90. The inspection apparatus 4 further includes a liquid crystal display (LCD) 60, an operation device 70, and a specialized device 80, which are connected to the I/F 50.

The CPU 10 is implemented by a processor such as a microprocessor, which is capable of controlling entire operation of the inspection apparatus 4. The RAM 20 is implemented by a volatile memory that writes various data thereto or reads various data therefrom with relatively high speeds. The RAM 20 may be used as a work memory area of the CPU 10. The ROM 30 is implemented by a nonvolatile memory from which various data is read. The ROM 30 may store various programs such as firmware. The HDD 40 is implemented by a nonvolatile memory from which various data is read. The HDD 40 may store various control programs such as an operating system (OS), and application programs such as the inspection control program.

The I/F 50 allows various hardware devices to be connected through the bus 90 or to the outside through a network, and controls these connections. The LCD 60 functions as a user interface, which allows a user to visually check status of the inspection apparatus 4. The operation device 70 functions as a user interface, which allows the user to input various data to the inspection apparatus 4 using, for example, a keyboard or a mouse. The LCD 60 and the operation device 70 may be integrated into one device, for example, in the form of a touch panel screen.

The specialized device 80 is a hardware device that causes the information processing apparatus of FIG. 2 to additionally have specialized functions to cause the information processing apparatus to function as the inspection apparatus 4. More specifically, with the specialized device 80, the CPU 10 converts the binary image into the multivalue image to generate the master image, adding a pattern to the master image, or compares the master image with the read image of the printed image. The specialized device 80 may be implemented by, for example, Application Specific Integrated Circuit (ASIC).

The specialized functions of the inspection apparatus 4 may be alternatively implemented by software, such as the inspection control program that is stored in a memory such as the ROM 30, HDD 40, or any desired recording medium such as an optical disc. When executed by the CPU 10, the inspection control program may be read onto the RAM 20 to cause the CPU 10 to control various hardware devices of FIG. 2 according to the control program.

Alternatively, the specialized functions of the inspection apparatus 4 may be realized by a combination of software and hardware such as a combination of the inspection control program and the ASIC of the specialized device 80.

The control section of the print engine 3 is substantially similar in hardware structure to the inspection apparatus 4 of FIG. 2, except that the specialized device 80. The specialized device 80 causes the information processing apparatus of FIG. 2 to additionally have specialized functions such that the information processing apparatus functions as the print engine 3. More specifically, the specialized device 80 of the print engine 3 includes a plotter that forms a printed image on a recording sheet, and a reading device that reads the printed image into read image data.

The control section of the engine controller 2 is substantially similar in hardware structure to the inspection apparatus 4 of FIG. 2, except for the specialized device 80. The specialized device 80 causes the information processing apparatus of FIG. 2 to additionally have specialized functions such that the information processing apparatus functions as the engine controller 2. For example, the specialized device 80 causes the engine controller 2 to control forming of a printed image and inspecting of the printed image.

FIG. 3 illustrates a schematic block diagram illustrating functional structures of the print engine 3 and the inspection apparatus 4, according to an example embodiment of the present invention. As illustrated in FIG. 3, the print engine 3 includes a print processor 301, a reading device 302, and a P pattern generator 303. The inspection apparatus 4 includes a read image obtainer 401, a master image generator 402, a P pattern generator 403, an inspection controller 404, and a comparator 405.

The print processor 301 obtains the binary image from the engine controller 2, and forms an image of the binary image on a recording sheet to output a printed image. In this example, the print processor 301 is implemented by an image forming device that forms an image using the electrophotographic method, such as a tandem-type image forming device. Alternatively, the print processor 301 may be implemented by any other desired image forming device such as an inkjet printer. In this example, the binary image generated by the engine controller 2 is an image in which each pixel is expressed by 1 bit of cyan, magenta, yellow, and black colors (total of 4 bit), with resolution of 600 dots per inch (dpi). The engine controller 2 further inputs the binary image to the inspection apparatus 4.

The reading device 302 reads the printed image formed on the recording sheet, which is output from the print processor 301, into read image data, and outputs the read image to the inspection apparatus 4. The reading device 302 is implemented by a line scanner, which is provided in the print engine 3 such that the reading device 302 can scan the printed image formed on the recording sheet as the recording sheet is transferred and output from the print engine 3. For example, the reading device 302 may be disposed along a transfer passage through which the recording sheet is transferred. As the recording sheet is being transferred, the reading device 302 reads the printed image formed on the recording sheet by scanning the surface of the recording sheet.

The P pattern generator 303 generates a P pattern, which is a yellow color pattern that is hardly perceptible to the human eye, and inputs the P pattern to the print processor 301. When forming the image on the recording sheet, the print processor 301 causes the P pattern to be superimposed on a layer of the printed image such that the printed image and the P pattern are formed on the recording sheet.

FIG. 4 illustrates one unit of an example P pattern. The P pattern includes 64 dots in the vertical direction and 64 dots in the horizontal direction. Each circle in FIG. 4 has a size that is 2 dots in the vertical direction and 2 dots in the horizontal direction. In this example, the P pattern contains information indicating a specific apparatus that outputs the printed image formed on the recording sheet. More specifically, the P pattern is generated according to a code that is uniquely assigned to each apparatus, such that a specific apparatus that outputs the printed image can be identified using the P pattern.

The black circle in FIG. 4 indicates dots functioning as a mark for defining one unit of P pattern, i.e., an area specifying one unit of P pattern. The dots expressed in black circle are to be added, irrespective of the contents of a code. In this example, the dot expressed in black color is added to the upper left corner of each unit of P pattern. The white circle in FIG. 4 indicates dots functioning as a mark for defining one unit of P pattern, but is not formed irrespective of the contents of the code. In this example, the dots expressed in white color are added at edges of one unit of P pattern. The gray circle in FIG. 4 indicates dots functioning as a mark for specifying the specific apparatus that forms the printed image, and is to be added depending on the contents of the code. With the dots expressed in gray color, a specific apparatus forming the printed image can be identified. Further, it is to be noted that each dot of the P pattern of FIG. 4, which is to be added to the printed image, is formed with yellow color.

Figure 5:
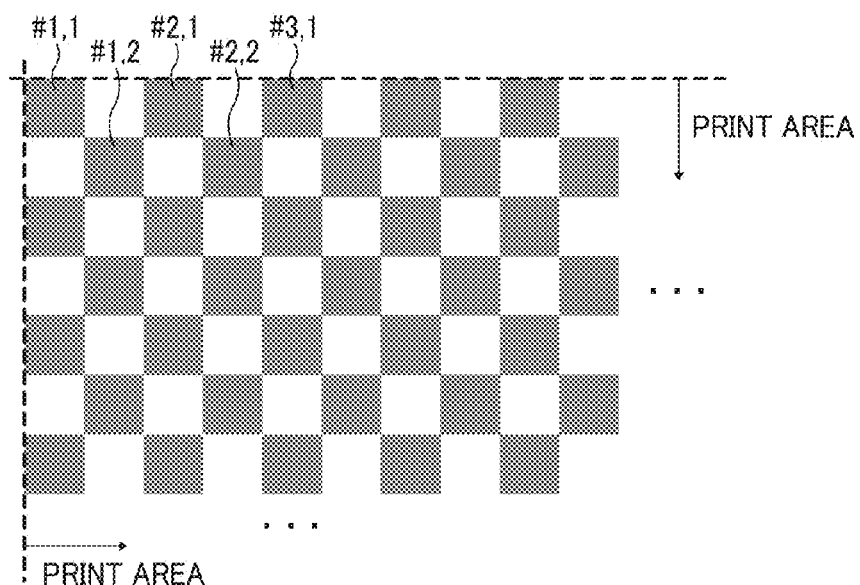
FIG. 5 is an illustration for explaining the image to which the P pattern of FIG. 4 is added.

FIG. 5 illustrates a part of the recording sheet formed with the printed image and the P pattern added to the printed image. Each of the gray boxes in FIG. 5 indicates one unit of the P pattern of FIG. 4. As illustrated in FIG. 5, a plurality of units of P pattern are arranged in zigzag from the edge of an area where the image is printed ("print area").

In this example, the master image to be generated by the inspection apparatus 4 is added with a plurality of units of P pattern of FIG. 4 in a form indicated by FIG. 5. The P patterns, which may be detected respectively in the read image and the master image, are later used as a reference point to match the pixel positions of the read image and the master image. Some units of the P pattern, when overlapped with the printed image formed on the recording sheet, can be hardly detected. Especially when the image has a section with a yellowish background color, the units of yellow P pattern that are added to that section are hardly detected such that these units of P pattern may not be effectively used as the reference point. In view of this, in the following examples, the inspection apparatus 4 further extracts corners of the image, as a candidate reference point. The inspection apparatus 4 selects one or more reference points that can be effectively used to detect the positional shift from the P pattern units and the corners, thus allowing comparison between the read image and the master image be performed with improved accuracy.

Further, when the printed image is generated in monochrome, the P pattern is not added to the printed image to be formed on the recording sheet. In such case, the inspection apparatus 4 uses the corners of the image, which are extracted respectively from the master image and the read image, as a reference point to detect the positional shift in the read image with respect to the master image.

Referring back to FIG. 3, a functional structure of the inspection apparatus 4 is explained according to an example embodiment of the present invention. The read image obtainer 401 obtains the read image output from the print engine 3, and inputs the read image to the comparator 404 as an image for inspection. The master image generator 402 obtains the binary image input by the engine controller 2, and generates a master image to be compared with the read image subjected for inspection. The master image generator 402 sets a reference point in the master image, which is used to match the pixel positions of the read image and the master image.

The P pattern generator 403 is substantially similar in function to the P pattern generator 303 of the print engine 3. More specifically, the P pattern generator 403 generates the P pattern as illustrated in FIG. 4, and inputs the P pattern to the master image generator 402. With image data of the P pattern, the master image generator 402 generates the master image to which the P pattern is added in a substantially similar manner as described above referring to FIG. 5.

The inspection controller 404 functions as a controller that controls entire operation of the inspection apparatus 4, for example, by controlling each unit or device of the inspection apparatus 4. The comparator 405 compares the read image input by the read image obtainer 401 with the master image generated by the master image generator 402 to determine whether the printed image formed by the print engine 3 is in good quality as expected. The comparator 404 may be implemented by the ASIC of the specialized device 80 such that the comparator 404 is able to compute a large amount of data with high speeds.

Figures 6, 7:
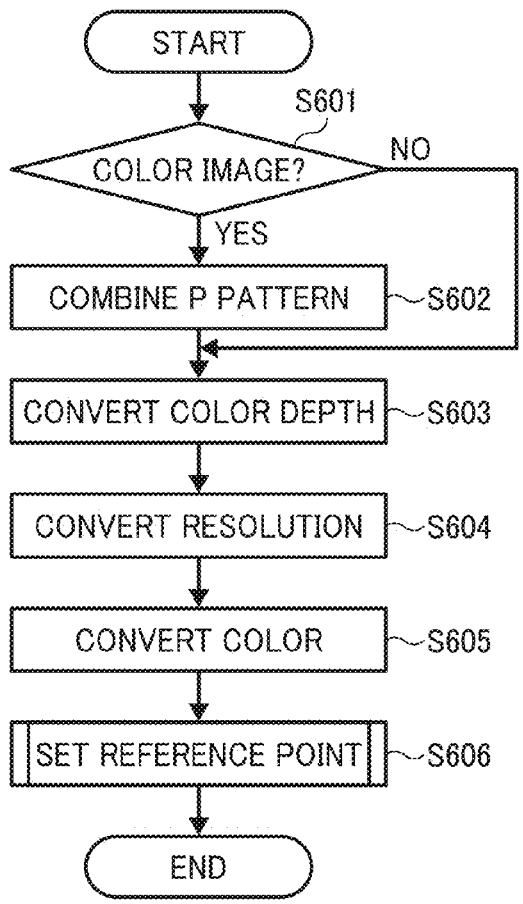
FIG. 6 is a flowchart illustrating operation of generating a master image, performed by the inspection apparatus of FIG. 1, according to an example embodiment of the present invention.
FIG. 7 is an example data structure of a P pattern availability table, managed by inspection apparatus of FIG. 1.

Referring now to FIG. 6, operation of generating a master image, performed by the master image generator 402, is explained according to an example embodiment of the present invention.

At S601, the master image generator 402 obtains the binary image from the engine controller 2, and determines whether the binary image is color (chromatic) or monochrome. In alternative to determining whether the binary image is color or monochrome by referring to the binary image, the master image generator 402 may determine whether the binary image is color or monochrome based on flag information indicating whether the binary image is color or monochrome. The flag information may be generated by the engine controller 2, and sent to the inspection apparatus 4 together with the binary image.

When it is determined that the binary image is color ("YES" at S601), the master image generator 402 determines that the P pattern is to be added to the binary image obtained from the engine controller 2 to output a determination result. Based on the determination result, the inspection controller 404 instructs the P pattern generator 403 to generate image data of P pattern. At S602, the master image generator 402 obtains image data of the P pattern from the P pattern generator 403 under control of the inspection controller 404, and combines the binary image with the P pattern by superimposing the P pattern on the binary image, in a substantially similar manner as described above referring to FIG. 5.

Further, at S602, as illustrated in FIG. 5, the master image generator 402 assigns an identification number (such as "#1, 1", "#1, 2", etc.) to each unit of the units of the P pattern that are added to the master image. Each of the identification number of the P pattern unit is managed in association with location information indicating a specific coordinate value of the master image at which the specific unit of P pattern is formed. In this manner, the identification number can be used to specify a specific P pattern unit in the master image.

The master image generator 402 further determines whether each one of the P pattern units can be used as a reference point. Assuming that the master image generator 402 obtains the binary image in which each pixel is expressed in K and Y colors, for the K plane and the Y plane of the binary image, the master image generator 402 determines whether an area to which the P pattern, assigned with a specific identification number, is added contains any image data to generate a determination result. Based on the determination result, the master image generator 402 generates a P pattern availability table indicating whether the P pattern assigned with the specific identification number can be used as a reference point for detecting the positional shift in the read image. For example, the P pattern availability table of FIG. 7 may be generated and stored in any desired memory of the inspection apparatus 4.

Referring to FIG. 7, the P pattern availability table stores, for each one of the P pattern units of the master image, a pattern number that is one example of an identification number, a coordinate value indicating the coordinate value of the master image to which the P pattern unit is added, and availability information indicating whether the P pattern unit can be used as a reference point, in association with one another.

In this example, the master image generator 402 determines that the P pattern unit can be used as a reference point, when an area to which the P pattern unit having the specific identification number is added, has no image data for both of the K and Y planes. More specifically, when the area to which the P pattern is added contains no image data, the master image generator 402 enters the value "Y" indicating that the P pattern unit can be used as a reference point, in association with the pattern number and the coordinate value of the P pattern availability table of FIG. 7. When the area to which the P pattern is added contains image data, the master image generator 402 enters the value "N" indicating that the P pattern unit is not appropriate as a reference point. Alternatively, the mater image generator 402 may only enter the P pattern unit that can be used as a reference point in the table, such that the table of FIG. 7 may only store the P pattern units that are determined as a candidate for a reference point. In such case, a field for the availability information may not be provided in the table.

Further, in this example, as illustrated in FIG. 5, the coordinate value of the P pattern availability table of FIG. 7 is a coordinate value of the upper left corner of the square shape of the P pattern. The left corner of the P pattern corresponds to the dot expressed in black circle, which is located at the upper left of the P pattern of FIG. 4.

Referring back to FIG. 6, at S603, the master image generator 402 converts the binary image in which each pixel is expressed in one bit of KY colors, to a multivalue image in which each pixel is expressed in eight bits of CMYK colors. In this example, resolution of the multivalue image is 600 dpi.

At S604, the master image generator 402 further converts the multivalue image of 600 dpi to the multivalue image of 200 dpi. Along with resolution conversion, the coordinate value is multiplied or divided according to the degree of change in resolution. For example, in case of generating the master image of 200 dpi based on the binary image of 600 dpi, the coordinate value of the binary image, obtained at S602, is divided by 3 to obtain the coordinate value of the master image with lower resolution. This coordinate value of the master image is then stored in the P pattern availability table of FIG. 7.

At S605, the master image generator 402 converts the 8-bit CMYK image to a 24-bit RGB image, with resolution of 200 dpi. In this manner, the multivalue image, i.e., the master image, has a data format that is equal to the data format of the read image generated by the print processor 3.

When it is determined that the binary image is monochrome ("NO" at S601), the operation proceeds to S603, without performing S602. Since S602 is not performed, the P pattern is not added to the master image. In such case, at S603, the master image generator 402 converts the binary image of 1 bit to the binary image of 8 bits. At 605, the master image generator 402 converts a K component of the binary image to a RGB image to generate a master image.

At S606, the master image generator 402 sets a reference point in the master image, which is used to match the pixel positions of the master image and the read image.

Figures 8, 9:
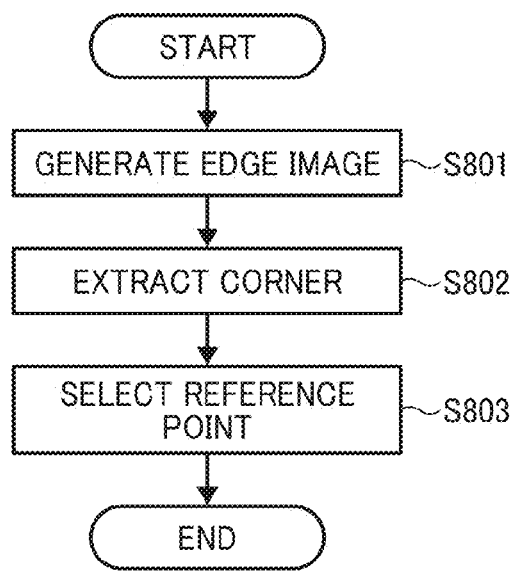
FIG. 8 is a flowchart illustrating operation of setting a reference point in the image, performed by the inspection apparatus of FIG. 1, according to an example embodiment of the present invention.
FIG. 9 is an illustration of an example edge extraction filter to be applied to the image to generate an edge image.

Referring now to FIG. 8, operation of setting a reference point in the master image, performed by the master image generator 402 at S606, is explained according to an example embodiment of the present invention.

Figure 10A:
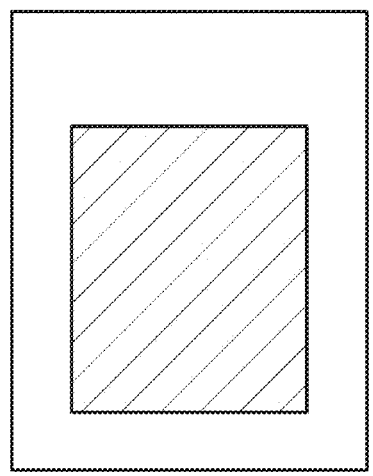
FIGS. 10A to 10C are an illustration for explaining example operation of extracting corners of the image as a reference point.
Figure 10B:
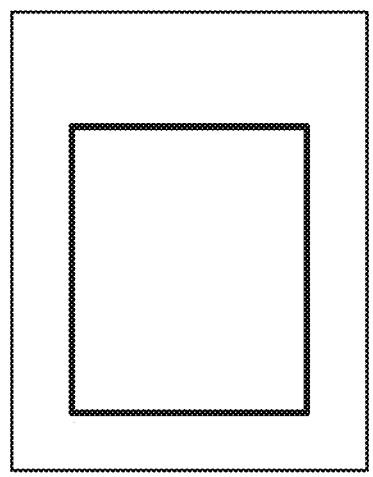

At S801, the master image generator 402 generates an edge image based on the master image. More specifically, the master image generator 402 applies an edge extraction filter as illustrated in FIG. 9 to the master image to extract an edge in the master image. The edge extraction filter of FIG. 9 is referred to as a Laplasian filter, which extracts the edge in the image based on the difference in image pixel between the adjacent pixels. Assuming that the edge extraction filter of FIG. 9 is applied to an image of FIG. 10A, the edge of the image is extracted as illustrated in FIG. 10B. In FIG. 10A, an area shown by diagonal lines is assumed to be a solid image area.

In alternative to applying the edge extraction filter of FIG. 9, the edge image may be extracted using any desired technique.

Figure 10C:
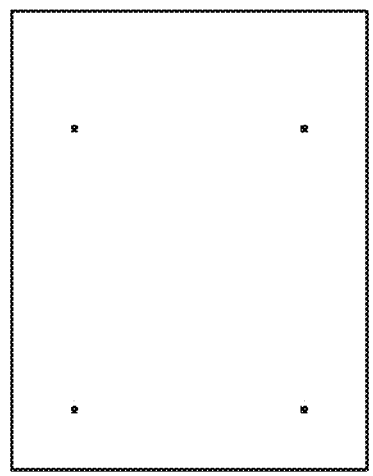

At S802, the master image generator 402 applies a plurality of filters to the edge image extracted at S801 to extract the corners of the edge image. For example, by applying corner extraction filters of FIGS. 11A to 11D to the edge image of FIG. 10B, four corners of the edge image are extracted as illustrated in FIG. 10C. The corner extraction filters of FIG. 11A to 11D each extract the corner in the image based on the difference in image pixel between the adjacent pixels.

Figures 12, 13, 14:
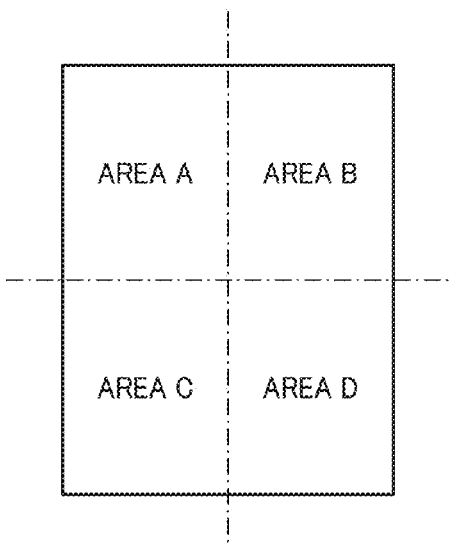
FIG. 12 is an illustration for explaining example operation of segmenting the image into a plurality of image areas.
FIG. 13 is an example data structure of a corner coordinate table, managed by the inspection apparatus of FIG. 1, according to an example embodiment of the present invention.
FIG. 14 is an example data structure of a reference point selection result table, managed by the inspection apparatus of FIG. 1.

More specifically, the master image generator 402 segments the maser image into a plurality of areas, as illustrated in FIG. 12. The area A is applied with the corner extraction filter of FIG. 11A to extract the upper left corner of the image. The area B is applied with the corner extraction filter of FIG. 11B to extract the upper right corner of the image. The area C is applied with the corner extraction filter of FIG. 11C to extract the lower left corner of the image. The area D is applied with the corner extraction filter of FIG. 11D to extract the lower right corner of the image. In this manner, four corners of the master image illustrated in FIG. 10C can be extracted from the edge image of FIG. 10B.

In the above-described example, four corners of the master image are extracted using the corner extraction filters of FIG. 11A to 11D. Alternatively, any desired technique may be applied to extract the corners of the master image.

For example, each area of the master image may be applied with the corner extraction filters of FIG. 11A to 11D to extract the corners of the master image. By applying a specific corner extraction filter for each area, the processing load required for corner extraction can be reduced.

Further, in alternative to extracting the corner after extracting the edge image, the corner extraction filters may be applied to the master image of FIG. 10A. By applying the corner extraction filter to only the edge image of FIG. 10B, however, the processing load required for corner extraction can be greatly reduced.

When the corners of the master image are specified, the master image generator 402 assigns an identification number ("coordinate number") to the coordinate value at which each corner is located, and stores the coordinate number and the coordinate value for each one of the extracted corners of the master image in association with one another to generate a corner coordinate table of FIG. 13. The corner coordinate table of FIG. 13 may be stored in any desired memory of the inspection apparatus 4.

Further, in this example, the master image generator 402 performs S801 and S802 of FIG. 8 for each one of R, G, and B planes of the master image. Accordingly, the corner coordinate table of FIG. 13 is generated for each one of R, G, and B planes of the master image.

Referring back to FIG. 8, at S803, the master image generator 402 refers to the coordinate value of each one of the P pattern units stored in the P pattern availability table of FIG. 7, and the coordinate value of the corner stored in the coordinate value table of FIG. 13, to select the coordinate value that is located far most from the center of the master image, for each one of the areas A to D of the master image of FIG. 12, for each one of the color planes of R, G, and B. For the P pattern units stored in the P pattern availability table of FIG. 7, the master image generator 402 only refers to the coordinate value of the P pattern unit having the availability "Y" indicating that the P pattern unit can be used as a reference point.

More specifically, the master image generator 402 calculates, for each one of the P pattern units of the P pattern availability table of FIG. 7, a distance with respect to the center of the master image. The master image generator 402 further calculates a distance of the coordinate value of the corner for a specific area of the image with respect to the center of the master image. Using the calculated distance values, the master image generator 402 selects the coordinate value of the P pattern unit or the corner, which is located far most from the image center. The reference point is selected for each one of the areas A to D of the master image, based on the distance of the coordinate value of each of the P pattern units and the coordinate value of the corner. This selection process is repeated for each one of the area A to D, for each one of color planes.

In alternative to selecting the reference point based on the distance with respect to the image center, the master image generator 402 may select any one of the P pattern units and the corner, according to a priority level that is previously assigned to the P pattern unit. For example, the P pattern availability table of FIG. 7 may additionally store priority information indicating a priority level assigned to each one of the P pattern units. As the coordinate value is stored for each one of the P pattern unit that is determined to be used as a candidate for a reference point, the master image generator 402 may assign a priority level based on how far the coordinate value is located from the image center. By referring to the priority level of the P pattern availability table of FIG. 7, the master image generator 402 is able to easily specify the P pattern unit having the coordinate value that is far most from the image center. The master image generator 402 compares the specified P pattern unit with the corner extracted from the master image to select one of the P pattern unit and the corner, which has the coordinate value that is far most from the image center.

In case when the binary image is determined to be monochrome at S601 of FIG. 6, the master image generator 402 does not perform S602 such that the P pattern availability table of FIG. 7 is not generated. In such case, the master image generator 402 selects the reference point based on the coordinate value table of FIG. 13. More specifically, the mater image generator 402 selects the corner of the master image for each of the areas A to D, for each of color planes.

The master image generator 402 selects a reference point for each one of the areas A, B, C, and D of the master image to obtain the total of four reference points in the master image, for each one of R, G, and B planes of the master image. The master image generator 402 further stores information indicating the selected reference point, such as information used for specifying the coordinate value of the selected reference point. For example, as illustrated in FIG. 14, the master image generator 402 generates a reference point selection result table, which stores, for each one of the selected reference points, plane information, area information, coordinate information, and selected pattern information in association with one another. The plane information indicates one of the R, G, and B planes of the master image, from which the reference point is extracted. The area information indicates one of the A, B, C, and D areas of the master image, from which the reference point is extracted. The coordinate information indicates the coordinate value of the mater image at which the reference point is located. The selected pattern information indicates identification information for uniquely identifying the reference point such as the pattern number or the coordinate number. The mater image generator 402 inputs the mater image and the reference point selection result table of FIG. 14 to the inspection controller 404, and the operation of FIG. 8 ends. The reference point selection result table of FIG. 14 may be stored in any desired memory of the inspection apparatus 4.

Figure 15:
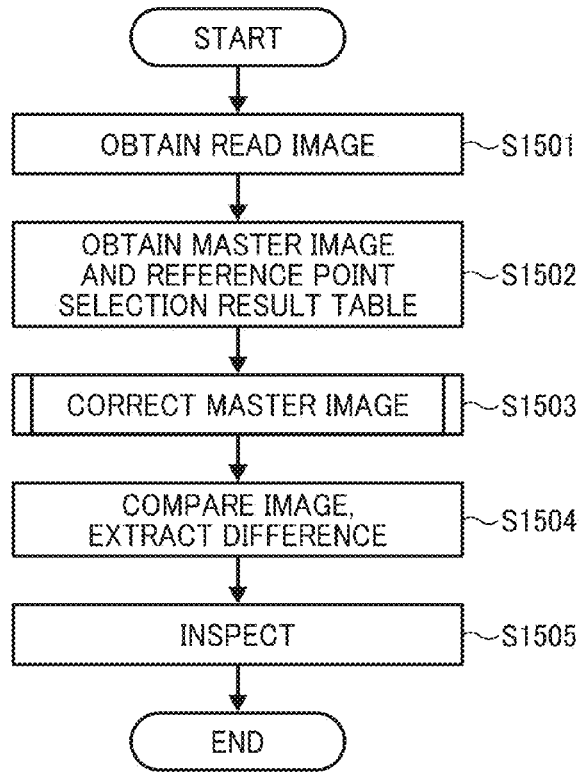
FIG. 15 is a flowchart illustrating operation of inspecting a printed image, performed by the inspection apparatus of FIG. 1, according to an example embodiment of the present invention.

Referring now to FIG. 15, operation of comparing the master image and the read image, performed by the comparator 405, is explained according to an example embodiment of the present invention.

At S1501, the comparator 405 obtains the read image from the read image obtainer 401 under control of the inspection controller 404.

At S1502, the comparator 405 obtains the master image and the reference point selection result table of FIG. 14 from the master image generator 402 under control of the inspection controller 404.

At S1503, the comparator 405 corrects pixel positions of the master image such that the pixel positions match between the master image and the read image, based on the read image and the reference point selection result table.

Figure 16:
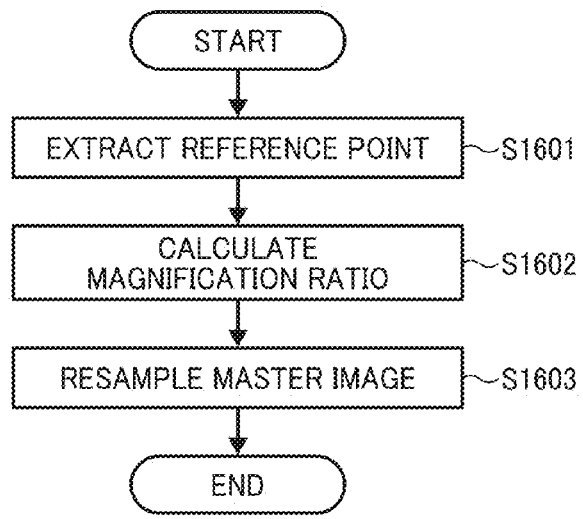
FIG. 16 is a flowchart illustrating operation of correcting a mater image, performed by the inspection apparatus of FIG. 1, according to an example embodiment of the present invention.

Referring now to FIG. 16, operation of correcting the master image, performed by the comparator 405 at S1503, is explained according to an example embodiment of the present invention.

At S1601, the comparator 405 extracts a plurality of reference points in the read image, which respectively correspond to the plurality of selected references points in the master image, using the reference point selection result table of FIG. 14.

For example, referring to FIG. 14, the selected reference point for the area A of the R plane of the master image is the P pattern unit that is identified with the pattern number "#1, 1", which is located at the coordinate value indicated by the coordinate information of FIG. 14. The comparator 405 searches through the read image for an area including a plurality of pixels surrounding a pixel that is located at the coordinate that corresponds to the specific coordinate of the reference point defined in the master image. The comparator 405 extracts a coordinate value of the pixel that corresponds to the reference point in the master image, as the reference point in the read image.

The area of the read image that is subjected for searching may be set, depending on the estimated value of positional shift that may be detected in the read image with respect to the master image. The estimated value of positional shift may be previously determined, using the relationship between the value of positional shift and an accumulated number of printed images that are sequentially printed by the print processor 301. For example, the relationship between the positional shift and the accumulated number of printed images may be stored in a memory of the inspection apparatus 4, such as the ROM 30 (FIG. 2). Assuming that the positional shift of 10 pixels is estimated, the comparator 405 extracts an image including a plurality of pixels surrounding the selected reference point, which extends from the selected reference point by 10 pixels in the directions of upward, downward, right, and left, as an image subjected for searching. Accordingly, the comparator 405 searches through the extracted image of 20 dots by 20 dots for the selected reference point, using pattern matching, to extract the reference point in the read image that corresponds to the selected reference point in the master image.

In another example, referring to FIG. 14, the selected reference point for the area B of the R plane of the maser image is the corner of the master image, which is identified with the "coordinate number #3" and is located at the coordinate value specified by the coordinate information of FIG. 14. In such case, the comparator 405 extracts the corner of the area B of the read image, for example, by applying filtering as described above referring to S801 to S802 of FIG. 8.

The above-described process of extracting the reference point in the read image, which corresponds to the selected reference point in the master image, is repeated for each one of the selected reference points.

At S1602, the comparator 405 compares the difference between the reference pint in the read image and the reference point in the master image to obtain the positional shift in the read image with respect to the master image. Based on the positional shift, the comparator 405 corrects the pixel positions of the master image so as to match with the pixel positions of the read image. For example, the comparator 405 calculates an enlargement ratio, which causes the master image to have the size that matches the size of the read image.

At 1603, the comparator 405 re-samples the master image based on the calculated enlargement ratio to generate the corrected master image, which matches the read image in pixel positions, and the operation ends.

Referring back to FIG. 15, the comparator 405 compares between the read image and the corrected master image to generate and output a differential image. More specifically, the comparator 405 obtains the difference in pixel value between each pixel in the read image and each pixel in the corrected master image, and generates a differential image containing the pixels having the obtained difference value. Assuming that the read image, i.e., the printed image is in good quality, the difference between the read image and the corrected master image is expected to have smaller values as the halftone value of each pixel is nearly the same for the read image and the corrected master image. This results in each pixel of the differential image to have a small value near "0". When the read image is not in good quality, the difference between the read image and the corrected master image is expected to have larger values as the halftone value of each pixel is different for the read image and the corrected master image. This results in each pixel of the differential image to have a larger value.

The comparator 404 further compares the differential image, or the difference value, with a predetermined threshold to determine whether the printed image is a defect image. For example, the comparator 405 may set a threshold for each of R, G, and B planes, and compares the differential value with the threshold for each of R, G, and B planes. Alternatively, the comparator 404 may calculate the shift in brightness, hue, and saturation ("color shift") based on the difference for each one of R, G, and B planes, and compares the calculated color shift with a threshold to determine whether the read image is a defect image. When the difference exceeds the threshold, the comparator 405 determines that the read image is a defect image. When the difference does not exceed the threshold, the comparator 405 determines that the read image is sufficiently in good quality. The inspection result obtained at S1505 may be output to a user, for example, through the LCD 60 as a message under control of the inspection controller 404. Alternatively, the inspection result may be output in the form of a sound such as a beep sound only when the defect image is detected. After the inspection result is output, the operation of FIG. 15 ends.

When the inspection result of the comparator 405 indicates that the read image is a defect image, the inspection controller 404 may send a request for re-printing the image to the engine controller 2. Based on this request, the engine controller 2 instructs the print engine 3 to print the image on the recording sheet.

As described above, the inspection apparatus 4 determines whether the P pattern added to the image can be effectively used as a reference point for detecting the position shift in the read image with respect to the master image, or correcting the positional shift in the read image with respect to the master image. When the P pattern cannot be effectively used, the inspection apparatus 4 uses the coordinate value of the corner of the image, which is previously extracted, as the reference point.

For example, when the printed image to be processed is a monochrome image, the P pattern is not added to the printed image. In such case, the inspection apparatus 4 uses a plurality of corners, which are respectively set in the master image and the read image, as a reference point to detect the positional shift between the master image and the read image.

In another example, when the background color of the printed image to be processed is yellowish, the P pattern, which is yellow in color, can be hardly detected. In such case, the inspection apparatus 4 may use a corner that is respectively set in the master image and the read image, as a reference point to detect the positional shift between the master image and the read image.

For example, when the Y plane of the binary image contains image data, the inspection apparatus 4 determines that the background color of the printed image is yellowish. In another example, when the background color of the recording sheet is yellowish, the inspection apparatus 4 determines that the background color of the printed image is yellowish.

In the above-described example, the inspection apparatus 4 generates the P pattern availability table of FIG. 7 to store information regarding one or more P pattern units that are candidates of reference point. Further, the inspection apparatus 4 generates the corner coordinate table of FIG. 13 to store information regarding the corners of the master image that are extracted as candidates of reference point. Using the P pattern availability table of FIG. 7 and the corner coordinate table of FIG. 13, the inspection apparatus 4 selects the reference point having the coordinate value that is far most from the image center, for each of the areas A to D, for each of the color planes. This is because the reference point that is close to the corner of the image may be effectively used to detect the positional shift, as the positional shift due to shrinking of the printed image tends to be greater at the corner of the image.

In alternative to generating the P pattern availability table of FIG. 7, the inspection apparatus 4 may only use the corner coordinate table of FIG. 13 to use the corner of the image as a reference point. In such case, the P pattern does not need to be generated.

In this example illustrated in FIG. 1, it is assumed that the DFE 1, the engine controller 2, the print engine 3, and the inspection apparatus 4 are each implemented by a separate apparatus. The image forming system of FIG. 1 may be implemented in various other ways.

Figure 17A:
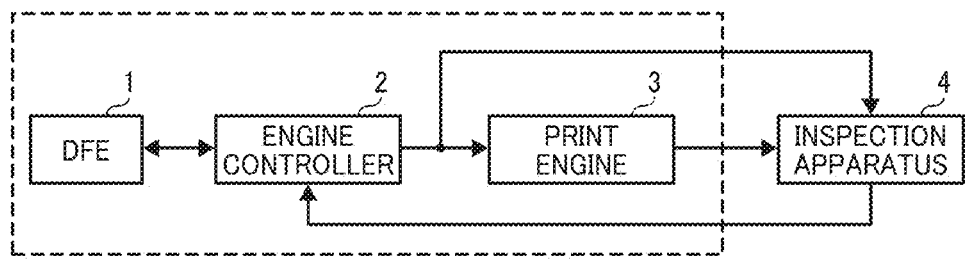
FIG. 17A is a schematic block diagram illustrating an image forming system including an inspection apparatus, according to an example embodiment of the present invention.
Figure 17B:
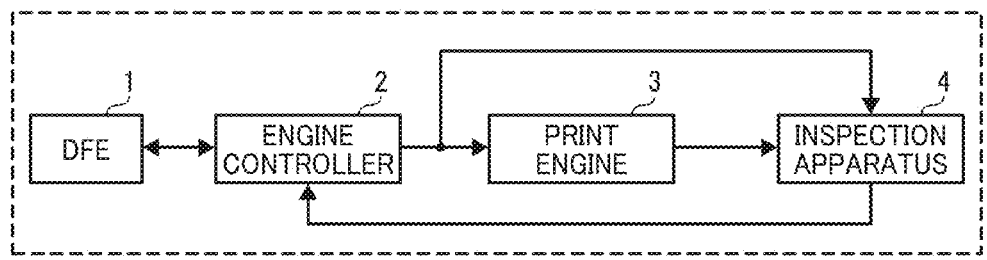
FIG. 17B is a schematic block diagram illustrating an image forming system including an inspection apparatus, according to an example embodiment of the present invention.

For example, as illustrated in FIG. 17A, the DFE 1, the engine controller 2, and the print engine 3 may be incorporated into one apparatus functioning as an image forming apparatus such as a printer. In another example, as illustrated in FIG. 17B, the DFE 1, the engine controller 2, the print engine 3, and the inspection apparatus 4 may be incorporated into one apparatus functioning as an image forming apparatus such as a printer.

In the above-described example illustrated in FIG. 1, the DFE 1, the engine controller 2, the print engine 3, and the inspection apparatus 4 are connected through a local interface such as a universal serial bus (USB) or a Peripheral Component Interconnect express (PCIe). Alternatively, the inspection apparatus 4 may be provided at a site that is remotely located from the DFE 1, the engine controller 2, and the print engine 3, as long as the inspection apparatus 4 is capable of communicating with the DFE 1, the engine controller 2, and the print engine 3. For example, the inspection apparatus 4 may be implemented by application that provides the inspection control function to the image forming system or the image forming apparatus through the network.

Figure 18:
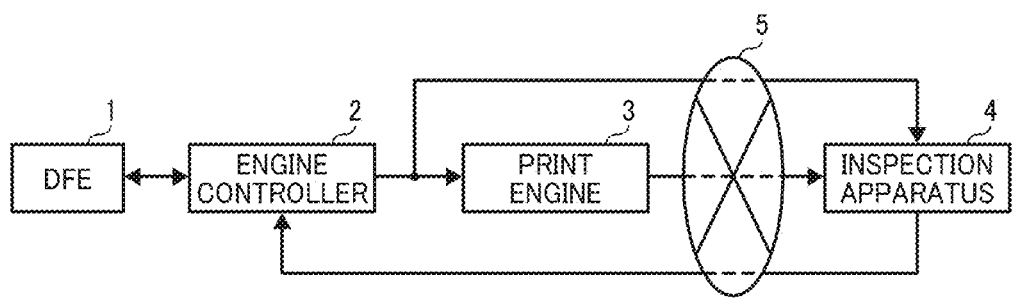
FIG. 18 a schematic block diagram illustrating an image forming system including an inspection apparatus, according to an example embodiment of the present invention.

For example, as illustrated in FIG. 18, the image forming system including the DFE 1, the engine controller 2, and the print engine 3, and the inspection apparatus 4 are connected through a public network such as the Internet. The engine controller 2 and the print engine 3 transmit various data or information to the inspection apparatus 4 through the network 5. The inspection apparatus 4 transmits an inspection result to the engine controller 2 through the network 5. In this manner, the inspection apparatus 4 does not have to be provided at the user site such that the user is able to reduce the initial cost that may be otherwise required to implement the function of inspecting the printed image.

The above-described operation of correcting the positional shift in the read image with respect to the master image may be performed in various other ways. For example, in alternative to correcting the master image, the read image may be corrected so as to cause the pixel positions to match between the master image and the read image.

Further, in alternative to using the yellow dot pattern as a dot pattern to be used for detecting the positional shift, any desired dot pattern may be used as long as the dot pattern is not perceptible to the human eye. For example, the pattern may be generated using colorant that is not visible under the natural light.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in an image inspection apparatus, which inspects a read image that is read from a printed image formed and output by an image forming apparatus. The image inspection apparatus includes: inspection image generating means for obtaining image data of the printed image that is used for forming the printed image by the image forming apparatus and generating the inspection image to be used for inspecting the printed image based on the image data; and image inspecting means for comparing the inspection image and the read image to inspect the read image. The inspection image generating means extracts a corner of the inspection image and stores the extracted corner as a reference point to be used for correcting pixel positions of the inspection image and the read image. The image inspecting means extracts a corner of the read image, and sets the extracted corner as a reference point to be used for correcting pixel positions of the inspection image and the read image. The image inspecting means corrects the pixel positions of the inspection image and the read image based on difference between the reference point in the inspection image and the reference point in the read image, and compares between the inspection image and the read image to inspect the read image.

For example, the inspection image generating means corresponds to the master image generator 402, which may be implemented by the CPU 10 that operates in cooperation with the inspection control program and/or the specialized device 80. The image inspecting means corresponds to the comparator 404, which may be implemented by the CPU 10 that operates in cooperation with the inspection control program and/or the specialized device 80.

In one example, the inspection image generating means extracts an edge image from the inspection image based on difference in pixel value between adjacent pixels, and further extracts the corner from the edge image. The image inspecting means extracts an edge image from the read image based on difference in pixel value between adjacent pixels, and further extracts the corner from the edge image.

When executing the corner, the inspection image generating means and the image inspecting means each segment the image to be processed into a plurality of areas, and extracts at least one corner for each one of the plurality of areas of the image.

The inspection image generating means and the image inspection image each select one of reference point candidates that is located far most from the image center as the reference point for each one of the plurality of areas of the image.

In the image inspection apparatus, the inspection image generating means generates the inspection image to which a pattern is added. The pattern being added is a pattern that is the added to the printed image formed by the image forming apparatus. The inspection image generating means further determines whether the pattern can be used as a reference point, based on whether an area of the inspection image to which the pattern is added contains image data to generate a determination result, and stores the determination result in a memory. The inspection image generating means selects one of the pattern that is determined to be used as the reference point and the corner extracted from the inspection image, which is located far most from the image center, as the reference point.

In one example, the present invention may reside in an image forming apparatus, which includes image forming means for forming and outputting the printed image, and image reading means for reading the printed image formed on the recording sheet and output from the image forming means. The image forming means corresponds to the print processor 301. The image reading means corresponds to the reading device 302.

In one example, the present invention may reside in a method of inspecting a read image that is read from a printed image formed and output by an image forming apparatus. The method includes: obtaining image data of the printed image that is used for forming the printed image by the image forming apparatus; generating the inspection image to be used for inspecting the printed image; extracting a corner of the inspection image to store the extracted corner as a reference point to be used for correcting pixel positions of the inspection image and the read image; obtaining the read image and extracting a corner of the read image to store the extracted corner as a reference point to be used for correcting pixel positions of the inspection image and the read image; correcting the pixel positions of the inspection image and the read image based on difference between the reference point in the inspection image and the reference point in the read image; and comparing between the inspection image and the read image to inspect the read image.

In one example, the present invention may reside in an image forming system, which inspects a read image that is read from a printed image formed and output by an image forming apparatus. The image forming system includes the image forming apparatus, an image reading apparatus that reads the printed image to generate the read image, and an image inspection apparatus that detects the read image. The image inspection apparatus includes: inspection image generating means for obtaining image data of the printed image that is used for forming the printed image by the image forming apparatus and generating the inspection image to be used for inspecting the printed image; and image inspecting means for comparing the inspection image and the read image to inspect the read image. The inspection image generating means extracts a corner of the inspection image and stores the extracted corner as a reference point to be used for correcting pixel positions of the inspection image and the read image. The image inspecting means extracts a corner of the read image, and sets the extracted corner as a reference point to be used for correcting pixel positions of the inspection image and the read image. The image inspecting means corrects the pixel positions of the inspection image and the read image based on difference between the reference point in the inspection image and the reference point in the read image, and compares between the inspection image and the read image to inspect the read image.

In one example, the present invention may reside in an image inspection apparatus, which inspects a read image that is read from a printed image formed and output by an image forming apparatus. The image inspection apparatus includes: inspection image generating means for obtaining image data of the printed image that is used for forming the printed image by the image forming apparatus and generating the inspection image to be used for inspecting the printed image; and image inspecting means for comparing the inspection image and the read image to inspect the read image. The inspection image generating means extracts a corner of the inspection image and stores the extracted corner as a reference point to be used for correcting pixel positions of the inspection image and the read image. When the image data of the printed image is chromatic, the inspection image generating means generate the inspection image to which a pattern is added. The pattern being added is a pattern that is added to the printed image formed by the image forming apparatus. The inspection image generating means further determines whether the pattern can be used as a reference point, based on whether an area of the inspection image to which the pattern is added contains image data to generate a determination result, and stores the determination result in a memory. The inspection image generating means selects one of the pattern that is determined to be used as the reference point and the corner extracted from the inspection image, which is located far most from the image center, as the reference point. The image inspection means extracts a reference point to be used for correcting pixel positions of the inspection image and the read image, which corresponds to the reference point in the inspection image. The image inspecting means corrects the pixel positions of the inspection image and the read image based on difference between the reference point in the inspection image and the reference point in the read image, and compares between the inspection image and the read image to inspect the read image.

In one example, the present invention may reside in a non-transitory recording medium storing a plurality of instructions which, when executed by a processor, cause the processor to perform any one of the above-described operation of inspecting a read image read from a printed image formed by an image forming apparatus.

For example, the method includes: obtaining image data of the printed image, which is used by the image forming apparatus to form the printed image; generating a master image based on the image data of the printed image, the master image being added with a plurality of units of pattern; storing in a memory pattern location information indicating a specific location in the master image to which a specific unit of pattern is added, for each one of the plurality of units of pattern; extracting one or more corners of the master image; storing in the memory corner location information indicating a specific location in the master image from which a specific corner is extracted, for each one of the one or more corners of the master image; selecting at least one of the plurality of units of pattern and the one or more corners of the master image as a reference point to be used for detecting a positional shift between the read image and the master image, using the pattern location information and the corner location information; extracting a reference point in the read image, which corresponds to the selected reference point in the master image; correcting pixel positions of one of the read image or the master image based on the positional shift between the reference point in the read image and the reference point in the master image to generate a corrected image; and inspecting the read image based on difference between the corrected image and the other one of the read image or the master image that is not corrected to generate an inspection result indicating whether the printed image sufficiently reproduces the image data of the printed image.

In another example, the present invention may reside in an inspection apparatus to inspect the read image, which includes: means for obtaining image data of the printed image, which is used by the image forming apparatus to form the printed image; means for generating a master image based on the image data of the printed image, the master image being added with a plurality of units of pattern; means for storing pattern location information indicating a specific location in the master image to which a specific unit of pattern is added, for each one of the plurality of units of pattern; means for extracting one or more corners of the master image; means for storing corner location information indicating a specific location in the master image from which a specific corner is extracted, for each one of the one or more corners of the master image; means for selecting at least one of the plurality of units of pattern and the one or more corners of the master image as a reference point to be used for detecting a positional shift between the read image and the master image, using the pattern location information and the corner location information; means for extracting a reference point in the read image, which corresponds to the selected reference point in the master image; means for correcting pixel positions of one of the read image or the master image based on the positional shift between the reference point in the read image and the reference point in the master image to generate a corrected image; and means for inspecting the read image based on difference between the corrected image and the other one of the read image or the master image that is not corrected to generate an inspection result indicating whether the printed image sufficiently reproduces the image data of the printed image.

For example, the means for obtaining, the means for generating, and the means for storing pattern location information, the means for extracting, and the means for storing corner location information, and the means for selecting, correspond to the master image generator 402. The means for extracting a reference point in the read image, the means for correcting, and the means for inspecting correspond to the comparator 405.

What is claimed is:
1. An inspection apparatus to inspect a read image that is read from a printed image output from an image forming apparatus, the inspection apparatus comprising:
 a processor to:
  obtain image data of the printed image, which is used by the image forming apparatus to form the printed image;
  generate a master image based on the image data of the printed image, the master image being added with a plurality of units of pattern;

store pattern location information indicating a specific location in the master image to which a specific unit of pattern is added, for each one of the plurality of units of pattern;

extract one or more corners of the master image;

store corner location information indicating a specific location in the master image from which a specific corner is extracted, for each one of the one or more corners of the master image;

select at least one of the plurality of units of pattern and the one or more corners of the master image as a reference point to be used for detecting a positional shift between the read image and the master image, using the pattern location information and the corner location information;

extract a reference point in the read image, which corresponds to the selected reference point in the master image;

correct pixel positions of one of the read image or the master image based on the positional shift between the reference point in the read image and the reference point in the master image to generate a corrected image; and inspect the read image based on difference between the corrected image and the other one of the read image or the master image that is not corrected to generate an inspection result indicating whether the printed image sufficiently reproduces the image data of the printed image.

2. The inspection apparatus of claim 1, wherein the processor is further configured to:

determine whether the printed image is monochrome or color, based on information regarding the image data of the printed image to generate a determination result, and when the determination result indicates that the printed image is monochrome, the processor generates the master image without adding the plurality of units of pattern thereto, and sets at least one of the one or more corners of the master image as the reference point to be used for detecting the positional shift between the read image and the master image.

3. The inspection apparatus of claim 1, wherein the processor is further configured to:

determine, for each one of the plurality of units of pattern, whether the specific location in the master image to which the specific unit of pattern is added contains image data to generate a determination result, and when the determination result indicates that the specific location of the specific unit of pattern does not contain image data, the processor stores availability information indicating that the specific unit of pattern can be used as a reference point in association with the pattern location information.

4. The inspection apparatus of claim 3, wherein the pattern is formed in yellowish color, and the determination result is generated based on whether the specific location of the specific unit of pattern contains image data for at least a yellow color plane of the image data.

5. The inspection apparatus of claim 3, further comprising:

a memory to store, for each one of the plurality of units of pattern, pattern identification information for identifying each one of the plurality of units of pattern, the pattern location information, and the availability information in association with one another.

6. The inspection apparatus of claim 5, wherein the memory further stores, for each one of the one or more corners of the master image, identification information for identifying each one of the one or more corners, and the corner location information, in association with one another.

7. The inspection apparatus of claim 6, wherein the processor selects at least one of the plurality of units of pattern and the one or more corners of the master image, which has a greatest distance between a location specified by the pattern location information or the corner location information, and a center of the master image.

8. The inspection apparatus of claim 7, wherein the processor segments the master image into a plurality of areas, and extracts a corner from each one of the plurality of areas of the master image to obtain the one or more corners of the master image.

9. The inspection apparatus of claim 8, wherein the processor selects at least one reference point for each one of the plurality of areas of the master image, and the memory further stores, for each one of the reference points, area information indicating one of the plurality of areas from which the reference point is extracted, location information indicating a location of the selected reference point in the master image, and identification information for identifying the selected reference point, in association with one another.

10. The inspection apparatus of claim 9, wherein the processor extracts an edge image from the master image based on difference in pixel value between adjacent pixels in the master image, and extracts the one or more corners from the edge image.

11. An image forming system, comprising:

an image forming apparatus configured to output a printed image and cause an image reading device to read the printed image into a read image; and an inspection apparatus configured to inspect the read image, the inspection apparatus including:

means for obtaining image data of the printed image, which is used by the image forming apparatus to form the printed image;

means for generating a master image based on the image data of the printed image, the master image being added with a plurality of units of pattern;

means for storing pattern location information indicating a specific location in the master image to which a specific unit of pattern is added, for each one of the plurality of units of pattern;

means for extracting one or more corners of the master image;

means for storing corner location information indicating a specific location in the master image from which a specific corner is extracted, for each one of the one or more corners of the master image;

means for selecting at least one of the plurality of units of pattern and the one or more corners of the master image as a reference point to be used for detecting a positional shift between the read image and the master image, using the pattern location information and the corner location information;

means for extracting a reference point in the read image, which corresponds to the selected reference point in the master image;

means for correcting pixel positions of one of the read image or the master image based on the positional shift between the reference point in the read image and the reference point in the master image to generate a corrected image; and means for inspecting the read image based on difference between the corrected image and the other one of the read image or the master image that is not corrected to generate an inspection result indicating whether the printed image sufficiently reproduces the image data of the printed image.

12. A method of inspecting a read image that is read from a printed image output from an image forming apparatus, the method comprising:

obtaining image data of the printed image, which is used by the image forming apparatus to form the printed image;

generating a master image based on the image data of the printed image, the master image being added with a plurality of units of pattern;

storing in a memory pattern location information indicating a specific location in the master image to which a specific unit of pattern is added, for each one of the plurality of units of pattern;

extracting one or more corners of the master image;

storing in the memory corner location information indicating a specific location in the master image from which a specific corner is extracted, for each one of the one or more corners of the master image;

selecting at least one of the plurality of units of pattern and the one or more corners of the master image as a reference point to be used for detecting a positional shift between the read image and the master image, using the pattern location information and the corner location information;

extracting a reference point in the read image, which corresponds to the selected reference point in the master image;

correcting pixel positions of one of the read image or the master image based on the positional shift between the reference point in the read image and the reference point in the master image to generate a corrected image; and inspecting the read image based on difference between the corrected image and the other one of the read image or the master image that is not corrected to generate an inspection result indicating whether the printed image sufficiently reproduces the image data of the printed image.

* * * * *